(12) United States Patent
Martin et al.

(10) Patent No.: US 9,878,584 B2
(45) Date of Patent: Jan. 30, 2018

(54) TREAD AND TIRE FOR HEAVY VEHICLE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Vincent Martin, Clermont-Ferrand (FR); Damien Bardin, Clermont-Ferrand (FR); Catherine Houis, Clermont-Ferrand (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 208 days.

(21) Appl. No.: 14/428,156

(22) PCT Filed: Sep. 9, 2013

(86) PCT No.: PCT/EP2013/068642
§ 371 (c)(1),
(2) Date: Mar. 13, 2015

(87) PCT Pub. No.: WO2014/040958
PCT Pub. Date: Mar. 20, 2014

(65) Prior Publication Data
US 2015/0273950 A1    Oct. 1, 2015

(30) Foreign Application Priority Data
Sep. 13, 2012   (FR) ...................... 12 58596

(51) Int. Cl.
*B60C 11/117*   (2006.01)
*B60C 11/12*    (2006.01)
*B60C 11/03*    (2006.01)

(52) U.S. Cl.
CPC ........ *B60C 11/0323* (2013.01); *B60C 11/032* (2013.01); *B60C 11/0306* (2013.01);
(Continued)

(58) Field of Classification Search
CPC ............. B60C 11/0306; B60C 11/1236; B60C 11/1281; B60C 11/032; B60C 11/0323;
(Continued)

(56) References Cited

U.S. PATENT DOCUMENTS 4,723,584 A * 2/1988 Yamaguchi ........... B60C 11/032
                                                    152/209.17
5,275,218 A    1/1994 Nakayama et al.
(Continued)

FOREIGN PATENT DOCUMENTS

EP    0335694 A2    10/1989
FR    2940185       6/2010
(Continued)

OTHER PUBLICATIONS

Machine translation for Japan 10-287110 (no date).*
International Search Report for PCT/EP2013/068642 dated Nov. 18, 2013.

*Primary Examiner* — Steven D Maki
(74) *Attorney, Agent, or Firm* — Dickinson Wright, PLLC

(57) ABSTRACT

Tread for heavy vehicle tire, this tread having a tread surface in the new state, this tread comprising a plurality of cuts opening onto the tread surface in the new state and at least one channel internal to the tread, this channel being intended to form a new groove after the tread has partially worn away, furthermore, each channel is extended radially towards the (Continued)

tread surface by a sipe of the same orientation as said channel and of width L4, and in addition a plurality of sipes of width L3 intersect the sipe extending each channel to form a well, this well opening both onto the tread surface in the new state and into a channel, the tread according to the invention being such that, for at least for a plurality of wells (each well has—in a direction extending from the tread surface towards the channel, at least one maximum-section part and one reduced-section part, the reduced-section part having a cross-sectional area smaller than the cross-sectional area of the maximum-section part so as to limit the ingress of foreign bodies of determined dimensions into this well and, from there, into a channel.

11 Claims, 2 Drawing Sheets

(52) U.S. Cl.
CPC ...... *B60C 11/1236* (2013.01); *B60C 11/1281* (2013.01); *B60C 2011/0346* (2013.01); *B60C 2011/0348* (2013.01); *B60C 2011/1213* (2013.01); *B60C 2011/1245* (2013.01)

(58) Field of Classification Search
CPC ..... B60C 2011/0346; B60C 2011/0348; B60C 2011/1213; B60C 2011/1245
See application file for complete search history.

(56) References Cited

U.S. PATENT DOCUMENTS

| | | |
|---|---|---|
| 5,445,691 A | 8/1995 | Nakayama et al. |
| 5,603,366 A | 2/1997 | Nakayama et al. |
| 2011/0168311 A1* | 7/2011 | Voss .................... B29D 30/0606 152/209.18 |
| 2011/0240192 A1* | 10/2011 | Cuny .................... B60C 11/032 152/209.21 |
| 2011/0277898 A1* | 11/2011 | Barraud .............. B60C 11/0306 152/209.18 |
| 2012/0024442 A1* | 2/2012 | Narita .................. B60C 11/032 152/209.18 |

FOREIGN PATENT DOCUMENTS

| | | | |
|---|---|---|---|
| FR | 2971732 | | 8/2010 |
| GB | 546975 A | * | 8/1942 |
| JP | 10-287110 A | * | 10/1998 |
| WO | 2010030276 | | 3/2010 |

\* cited by examiner

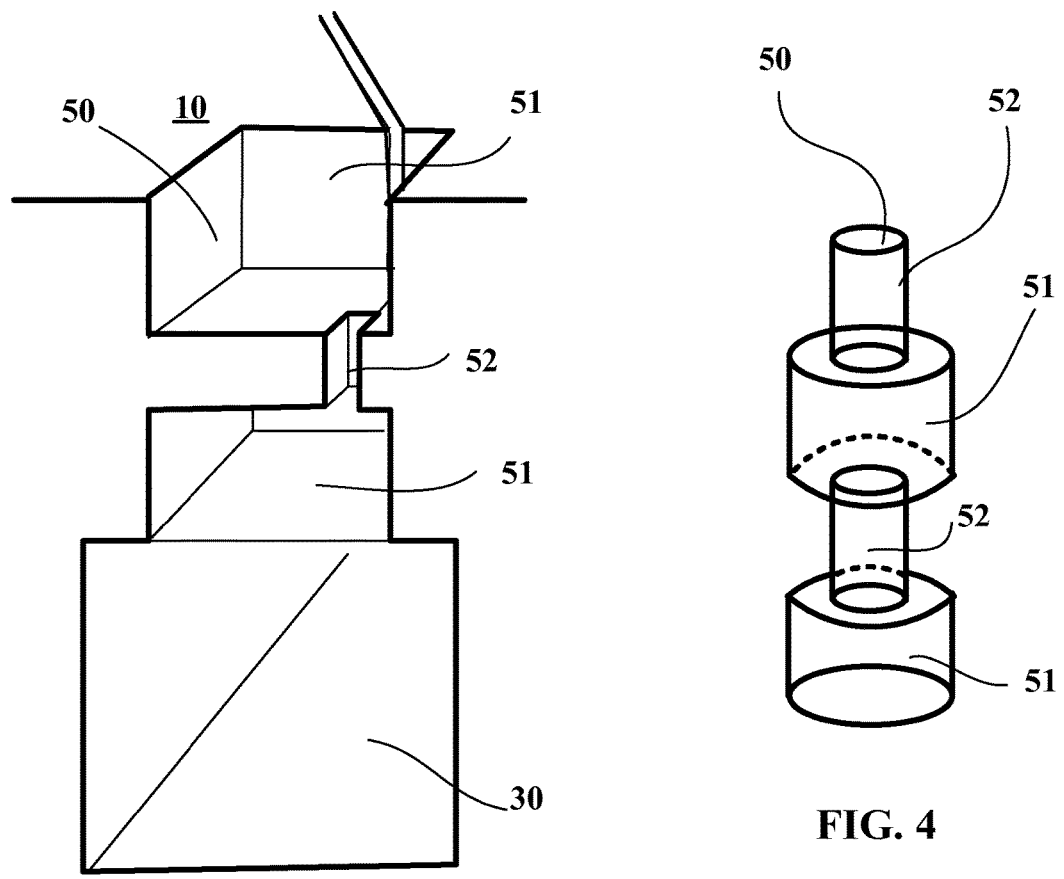
FIG. 3
FIG. 4
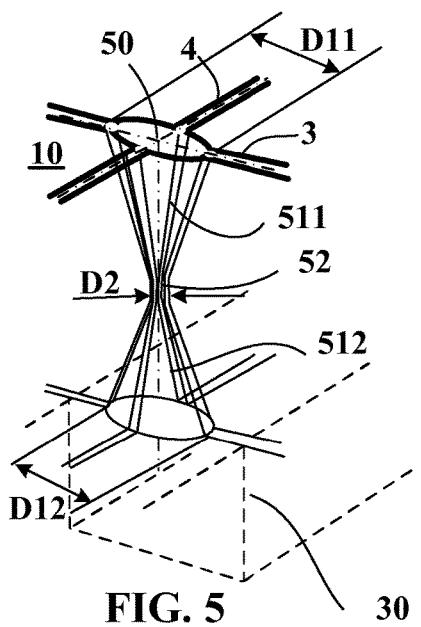
FIG. 5
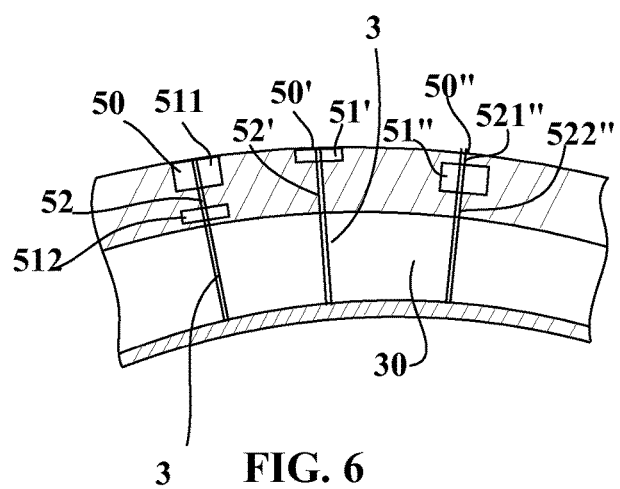
FIG. 6

TREAD AND TIRE FOR HEAVY VEHICLE

This application is a 371 national phase entry of PCT/EP2013/068642, filed 9 Sep. 2013, which claims benefit of French Patent Application No. 1258596, filed 13 Sep. 2012, the entire contents of which are incorporated herein by reference for all purposes.

BACKGROUND

Field

The present disclosure relates to the field of tire treads and, more specifically, treads of tires for vehicles of the heavy goods vehicle type, these treads having a tread surface the geometry of which changes with wear.

Description of Related Art

The tread of a tire corresponds to that part of the tire that is situated radially on the outside and extends in the circumferential direction to provide contact between the tire and the roadway and transmit forces. Contact between the tire tread and the roadway forms a contact patch. The purpose of the tread is to provide the tire with sufficient grip to prevent the tire from slipping, it being possible for such slippage to occur under acceleration, braking or cornering. A tire tread comprises voids in the form of grooves delimiting raised elements, such as ribs or blocks. Furthermore, these raised elements may be provided with sipes, namely kinds of cuts delimited by walls of material, these walls being distant from one another by a small enough distance for said walls to come at least into partial contact with one another when they enter the contact patch. These sipes have the purpose of creating additional edge corners of benefit notably in cutting into a layer of liquid that may be present on the roadway, while at the same time maintaining a high quantity of rubbery material. These sipes may, on the walls that delimit them, comprise means for limiting the relative movements of said walls. The collection of grooves and sipes constitutes a collection of edge corners on the tread surface with an initial geometry, it being possible for this initial geometry to remain unchanged whatever the degree of tire wear or to vary with wear in order to optimize the operation of the tread as a function of the remaining thickness of material.

One problem with which tire manufacturers are faced is that of maintaining tire performance throughout the use of the tire, namely irrespective of the level of tread wear. To such an end it has been proposed for the geometry of the edge corners of a tread to be made to alter with wear: document WO 2010072523-A1 describes a tread exhibiting such an evolution with wear.

In that patent application there is described a tire tread which, after partial wear, partially renews the volume of the grooves without thereby adversely affecting the performance of the tire. In order to achieve that, the tread comprises at least one channel formed under the tread surface in the new state, each channel being intended to appear after the tire is partially worn in order to form a new groove useful in draining away water in wet weather.

Thanks to this type of tread design, the depths of the grooves in the new state can be reduced by making new grooves appear after the tread has been partially worn. This then appreciably limits the compressibility of the tread and therefore reduces the dissipation of energy in the tread in the new state, which is beneficial in terms of fuel consumption.

The same patent document WO 2010072523-A1 provides the possible presence of a sipe of the same orientation as that of the channel, this sipe being situated between the channel tread surface. This sipe makes molding and demolding easier.

That same document also provides the presence of a plurality of sipes intersecting the sipe surmounting a channel, namely that these sipes have a direction distinct from the direction of the sipe surmounting the channel.

In order to improve the mechanical integrity of the molding elements placed in the mold for molding these sipes, it is known practice to provide for the presence of reinforcing parts, each reinforcing part molding, in the tread, a cavity opening both onto the tread surface in the new state and into a channel. While these cavities do assist in removing heat from the tread during running by generating ventilation in the channels, foreign bodies such as stones for example may enter them. Once these foreign bodies have entered a cavity, it has been found that they are able to migrate towards a channel and remain there until a sufficient level of wear sees the formation of a new groove. In the meantime, these foreign bodies will be able to attack the wall delimiting the channel and possibly attack that part of the tire that is situated radially underneath the tread, namely the crown reinforcement.

Document WO 2010/030276 A1 discloses such an embodiment. In this example, FIG. 4 in particular shows an intersection of two surfaces, one of these surfaces delimiting a cylindrical well with no variation in geometry in the depth.

Definitions:

The voids ratio of a tread pattern is equal to the ratio between the surface area of the voids (grooves) delimited by the blocks and the total surface area (contact surface area of the blocks and surface area of the voids). A low voids ratio indicates a large contact surface area of the blocks and a small surface area of voids between the blocks.

The voids surface ratio of a tread pattern is equal to the ratio between the surface area of the voids (essentially formed by grooves) delimited by the raised elements (blocks, ribs) and the total surface area (contact surface area of the raised elements and surface area of the voids). A low voids ratio indicates a large contact surface area of the tread and a small surface are of voids between the raised elements.

The voids volume ratio of a tread pattern of a tread in the new state is equal to the ratio between the volume of the voids (formed notably by grooves and cavities) delimited by the raised elements (blocks, ribs) and the total volume of the tread comprising the volume of material to be worn away and the volume of the voids. A low voids volume ratio indicates a low volume of voids relative to the volume of the tread. For each level of wear, a voids volume may also be defined.

The equatorial median plane is a plane perpendicular to the axis of rotation and passing through those points on the tire that are radially furthest from said axis.

A block is a raised element formed on the tread which element is delimited by voids or grooves and comprises lateral walls and a contact face intended to come into contact with the roadway. This contact face has a geometric center defined as the barycenter or center of gravity of the face.

A rib is a raised element formed on a tread, this element extending in the circumferential direction and making a full tour of the tire. A rib comprises two lateral walls and a contact face, the latter being intended to come into contact with the roadway during running.

Radial direction in this document means a direction which is perpendicular to the axis of rotation of the tire (this direction corresponds to the direction of the thickness of the tread).

A transversal or axial direction means a direction parallel to the axis of rotation of the tire.

A circumferential direction means a direction tangential to any circle centered on the axis of rotation. This direction is perpendicular both to the axial direction and to a radial direction.

Axially towards the outside means a direction which is directed towards the outside of the internal cavity of the tire.

The total thickness E of a tread is measured, on the equatorial plane of the tire provided with this tread, between the tread surface and the radially outermost part of the crown reinforcement in the new state.

A tread has a maximum thickness PMU of material to be worn away in running, this maximum thickness PMU being less than the total thickness E of the tread.

The usual conditions under which the tire is run or the conditions of use, are those defined by the ETRTO standard; these conditions of use specify the reference inflation pressure corresponding to the load bearing capability of the tire as indicated by its load index and speed rating. These conditions of use may also be referred to as "nominal conditions" or "normal conditions".

The contact patch in which the tire is in contact with the roadway is determined with the tire static; from this contact patch a mean value is calculated for the length of the contact patch in the circumferential direction.

A cut generically denotes either a groove or a sipe and corresponds to the space delimited by walls of material that face one another and are distant from one another by a non-zero distance (referred to as the "width of the cut"). What differentiates a sipe from a groove is precisely this distance; in the case of a sipe, this distance is suited to allowing the opposing walls that delimit said sipe to come at least partially into contact at least as the sipe enters the contact patch in which the tire is in contact with the roadway. In the case of a groove, the walls of this groove cannot come into contact with one another under usual running conditions.

The main dimensions of the cross section of a cavity or of a well here mean its diameter if this cavity has a cross section of circular shape, lengths of its minor and major axes if its cross section is oval or its width and length if it is of rectangular cross section. The main direction of a cavity or of a well here means the mean rectilinear direction of the cavity or of the well between the tread surface in the new state, onto which the cavity or the well opens at one of its ends, and a channel formed inside the tread and into which the cavity or the well opens at its other end.

SUMMARY

The present invention, in an embodiment, seeks to reduce the risk of attack by foreign bodies that may enter the tread notably by entering the wells formed at the intersection of two sipes formed in this tread.

To this end, one subject of the invention is a tread for heavy vehicle tire, this tread having a tread surface intended to come into contact with a roadway and a total thickness PMU of material to be worn away during running, this tread comprising a plurality of cuts opening onto the tread surface in the new state and at least one channel internal to the tread, this channel being intended to form a new groove after the tread has partially worn away.

Furthermore, each channel is extended radially towards the tread surface by a sipe of the same orientation as said channel and of width L4, and in addition a plurality of sipes of width L3 intersect the sipe extending each channel to form a region of intersection in the shape of a well, this well opening both onto the tread surface in the new state and into a channel.

The tread according to an embodiment of the invention is characterized in that, a plurality of wells are formed, each well having—in a direction extending from the tread surface towards the channel, at least one maximum-section part and one reduced-section part, the reduced-section part having a cross-sectional area smaller than the cross-sectional area of the maximum-section part so as to limit the ingress of foreign bodies of determined dimensions into this well and, from there, into a channel.

This arrangement, in addition to protecting the tread, has the advantage of making the manufacture easier and more robust during the molding. This is because the blades used for molding the sipes are joined together by parts that form a kind of optimized reinforcer, these parts molding the wells in the tread.

Advantageously, the maximum-section part of a well has a surface area greater than the product L3 times L4 of the widths L3, L4 of the sipes intersecting to form a well.

For preference, and in the case of at least a plurality of wells, the reduced section of each well is located on the inside of the tread in the new state; what that means is that this reduced section does not open onto the tread surface in the new state but opens onto a new tread surface after the tread has partially worn away.

Advantageously, each minimum-section part is able to close up completely as it enters the contact patch in which the tire is in contact with a roadway during running under normal conditions, so as to completely block the passage of any foreign body.

For preference, at least 50% and more preferably still, at least 75%, of the wells opening into one and the same channel have at least one maximum-section part and at least one reduced-section part. More preferably still, all the regions of intersection associated with one and the same channel comprise at least one reduced-section part and at least one maximum-section part.

This is because it has been found that, statistically, the number of attacks associated with the ingress of foreign bodies into the channels was substantially reduced by the mere fact of forming at least 50% of the regions of intersection with at least one reduced-section part and at least one maximum-section part. This beneficial effect increases with the number of regions of intersection that have a reduced section.

Advantageously, the minimum section is at most equal to 50% of the maximum cross-sectional area, and more advantageously still, at most equal to 10%.

In another preferred alternative form, the minimum cross-sectional area is close to or equal to zero.

In a preferred alternative form, the height of the minimum-section part is at least equal to 1 mm.

By virtue of embodiments of this invention, it is possible to obtain good mechanical integrity for the blades that mold the cuts without thereby making the tire provided with this tread more sensitive to attack by foreign bodies that may find their way into the regions of intersection.

If the intersecting sipes have different depths, the invention applies to the part that two sipes have in common.

Advantageously, the minimum section of a region of intersection is flanked by two maximum-section parts, a first maximum-section part opening onto the tread surface in the new state, and the other maximum-section part opening into a channel.

In one advantageous alternative form, a well forming a region of intersection of sipes may have a shape of continuously-variable cross section, for example which decreases from the tread surface in the new state and then increases to open into a channel. In this alternative form, the reduced-section part comprises that part of the region of intersection the cross-sectional area of which is minimal.

Advantageously, the reduced-section part of a well is offset from the main axis of this well by at least one maximum-section part so as to prevent any migration of foreign bodies from the maximal-section part into the reduced-section part, it being more difficult for this migration to take place when the opening of the reduced-section part into the maximum-section part occurs near the limits of this maximum-section part.

In another advantageous alternative form, and for one and the same channel, a succession of regions of intersection is formed, at least two of these regions of intersection differing geometrically in terms of the position of the reduced-section part in the depthwise direction of the region of intersection. This arrangement makes it possible to prevent all the parts of the same section appearing simultaneously and is therefore beneficial for obtaining wear that is evenly distributed around the circumference of the wheel when these regions of intersection are distributed in the circumferential direction.

There is proposed a tire provided with a tread formed according to one of the embodiments recommended by the invention. Of course, it is possible to combine within one and the same tire the presence of wells of different geometries.

Other features and advantages of the invention will emerge from the description given hereinafter with reference to the attached drawings which, by way of nonlimiting examples, show embodiments of the subject matter of the invention.

BRIEF DESCRIPTION OF THE FIGURES

FIG. 3 is a section through a cavity according to an embodiment of the invention;

FIG. 4 is an alternative form of cavity according to an embodiment of the invention;

FIG. 5 shows another alternative form of cavity according to an embodiment of the invention;

FIG. 6 shows in longitudinal section one distribution of cavities according to an embodiment of the invention.

DETAILED DESCRIPTION OF SPECIFIC EMBODIMENTS

To make the figures easier to understand, the same reference signs are used for describing alternative forms of the invention where these reference signs refer to elements which are either structurally or functionally of the same type.

Figure 1:
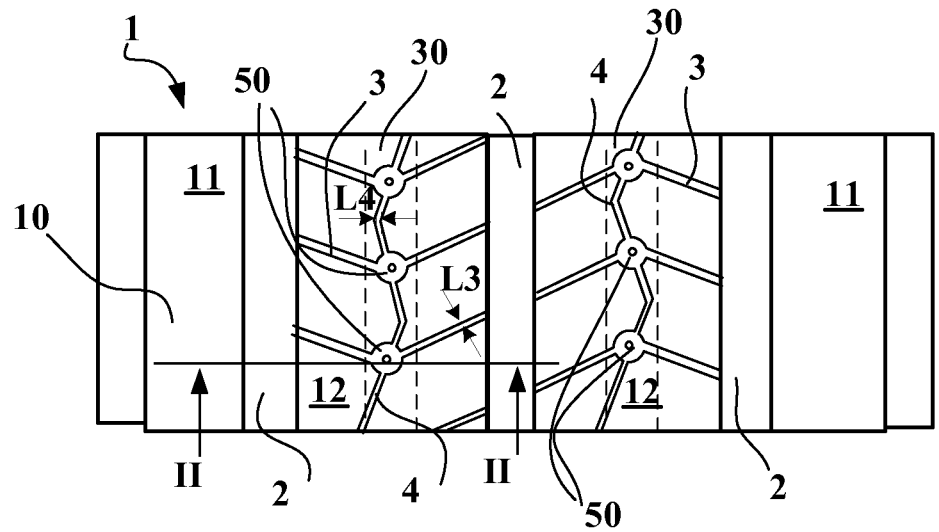
FIG. 1 is a plan view of a tread pattern of a tread according to an embodiment of the invention.

FIG. 1 shows a partial view of a tread 1 of a tire built according to the invention. This tire 1, here depicted in the unworn new state comprises a tread pattern formed of three main grooves 2 oriented circumferentially (or, which is equivalent: longitudinally). The main grooves 2 delimit intermediate ribs 12 and two edge ribs 11. These main grooves 2 open onto a tread surface 10 in the new state which tread surface is intended to be in contact with the roadway while a tire provided with said tread is being driven on.

In this new state, the main grooves 2 have the same depth P2 and a width L2 (shown in FIG. 2) and are beneficial notably for draining away water present on the roadway in wet weather. This FIG. 1 also shows the presence of channels 30 oriented circumferentially. These channels 30 are formed inside the tread and in the two intermediate ribs 12; furthermore, these channels 30 are extended towards the tread surface 10 in the new state by sipes 4 of mean width L4. These sipes 4 of circumferential overall orientation are intersected by sipes 3 of mean width L3 opening into the main grooves 2.

Each sipe 4 intersects the sipes 3 of one and the same rib at a plurality of intersection zones. Each intersection zone forms a well 50 connecting the tread surface in the new state 10 to a channel 30 radially underneath said tread surface.

Figure 2:
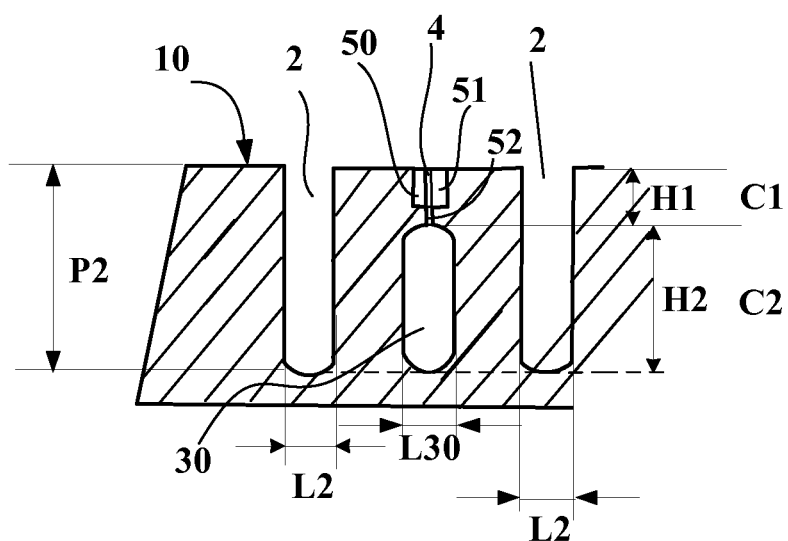
FIG. 2 is a view in cross section on a plane identified by line II-II in FIG. 1.

FIG. 2 is a cross section on a plane of section identified by line II-II on the tread surface 10 of the tread shown in FIG. 1. This cross section shows that the channels 30 are a distance H1 from the tread surface in the new state; this thickness H1 defines a first wearing layer C1 in which only the main grooves 2 are present and active. The channels 30 have a height H2 measured in the thickness of the tread: this height H2 defines a second wearing layer C2 which makes both the main grooves 20 and new grooves formed as soon as tread wear is at least equal to the height H1 active. Each channel 30 has a width L30 substantially equal to the width L2 of the main grooves 2.

In this way, the surface area of groove in contact with the roadway is substantially increased (and the edge corner lengths too in proportion), while at the same time returning to a grooves volume that is substantially identical to what it was in the new state.

It may be seen that the well 50 is formed—in a direction extending from the tread surface towards the channel, of two parts, a maximum-section first part 51 and a reduced-section second part 52, the maximum-section part 51 opening onto the tread surface in the new state 10. The reduced-section part 52 has a cross-sectional area smaller than the cross-sectional area of the maximum-section part 51. Thanks to this arrangement it is possible to limit the ingress of foreign bodies of determined dimensions into this well of the tread surface and as far as the channel without thereby impeding the manufacture of the tread or the manufacture of the mold for molding said tread. The reduced-section part has a circular cross section of diameter smaller than 1 mm whereas the other maximum-section parts are of circular shape with diameters equal to 5 mm. The sipes 3, 4 have widths L3, L4 equal to 0.6 mm.

The maximum-section part has a surface area greater than the product of the mean widths L3, L4 of the sipes converging on each well 50.

In an alternative form shown in cross section in FIG. 3, the well 50—towards which several sipes converge (just one being partially depicted here), comprises two maximum-section parts 51 flanking a reduced-section part 52. The reduced-section part has a square cross section with a side length equal to 1 mm whereas the other, maximum-section, parts are of square shape with a side length equal to 5 mm. In this particular instance, the reduced-section part 52 is off-centered with respect to the other two, maximum-section, parts 51, which have an axis in common. This well 50 connects the tread surface 10 in the new state to a channel 30.

FIG. 4 shows an alternative form of well 50 according to the invention comprising an alternation of maximum-section parts 51 and of reduced-section parts 52, a reduced-section part 51 opening onto the tread surface 10 in the new state. The depths of the various parts are, in the scenario depicted, equal to one another although of course it is possible to envision reducing the depths of the reduced-section parts in order to increase the voids volume available for collecting a liquid present on the roadway. Sipes—not depicted—converge on this well 50 to intersect. In this alternative form, the various parts are positioned on the same axis; of course these same parts could be formed in such a way as to off-center them from one another as in the alternative form shown in FIG. 3.

FIG. 5 shows an alternative form of well 50 at the intersection of two sipes, this well 50 opening onto the tread surface 10 in the new state at one of its ends and into a channel 30 at its other end. This well 50 has a shape of a cross section that can vary over practically its entire depth: a first maximum-section part 511 opens onto the tread surface via a maximum section of diameter D11 and connects to a small-section cylindrical-section part 52 of diameter D2, the latter diameter being far smaller than the diameter D11. Radially on the inside of the cylindrical-section part 52 of diameter D2 can be seen a part 512 of a cross section that widens progressively until it has a diameter D12 far greater than the diameter D2, this part opening into a channel 30.

FIG. 6 shows a cross section of a tire tread according to an embodiment of the invention, this cross section being on a plane perpendicular to the axis of rotation of the tire. This cross section is on a rib containing a channel 30 under the tread surface, this channel 30 being extended towards said tread surface by a circumferentially oriented sipe. Furthermore, this circumferential sipe is intersected by a plurality of transversely oriented sipes 3, the lines of which can be seen in FIG. 6. Wells 50, 50', 50" are formed at the intersections of these transverse sipes 3 with a circumferential sipe. One well 50 is formed of two maximum-section parts 511 and 512 flanking a reduced-section part 52. Another well 50' comprises an enlarged-section part 51' opening onto the tread surface in the new state and extended by a reduced-section part 52' opening into the channel 30. Another well 50" comprises two reduced-section parts 521" and 522" flanking a maximum-section part 51". Such an arrangement, which distributes the widened-section parts and the reduced-section parts in a manner that is offset between the wells of one and the same rib allows tread wear to be made more even. A succession of wells is thus formed, at least two of these wells being geometrically different in terms of the position of the reduced-section part in the depthwise direction of the region of intersection.

To conclude this description of a number of alternative forms there is no need to emphasize that the invention should not be restricted to these alternative forms described and depicted and that of course various modifications can be made thereto without departing from the scope defined by the claims. In particular, all the alternative forms described can be adapted so that the reduced-section parts can close up completely as they enter the contact patch, by making them with suitable cross sections and heights.

The invention claimed is:

1. A tread for heavy vehicle tire, this tread comprising:
   a tread surface in the new state intended to come into contact with a roadway and a total thickness PMU of material to be worn away during running,
   a plurality of cuts opening onto the tread surface in the new state and
   at least one channel internal to the tread, and adapted to form a new groove after the tread has partially worn away,
   a sipe extending from each channel radially towards the tread surface, and of the same orientation as said channel and of width L4, and
   a plurality of sipes of width L3 that intersect the sipe extending each channel to form a well,
   wherein this well opens both onto the tread surface in the new state and into a channel, wherein for at least for a plurality of wells, each well comprises, in a direction extending from the tread surface towards the channel, at least one maximum-section part and at least one reduced-section part, wherein the reduced-section part has a cross-sectional area smaller than the cross-sectional area of the maximum-section part so as to limit the ingress of foreign bodies of determined dimensions into this well and, from there, into the channel, and
   wherein the reduced-section part of each of a plurality of the wells is able to close up completely as it enters the contact patch in which the tread is in contact with the roadway when running under normal conditions, so as to completely block the ingress of any foreign body.

2. The tread according to claim 1, wherein at least 50% of the wells opening into one and the same channel have at least one maximum-section part and one reduced-section part.

3. The tread according to claim 2, wherein at least 75% of the wells opening into one and the same channel have at least one maximum-section part and one reduced-section part.

4. The tread according to claim 3, wherein all of the wells opening into one and the same channel have at least one maximum-section part and one reduced-section part.

5. The tread according to claim 1, wherein the maximum-section part of a well has a surface area greater than the product L3 times L4 of the widths L3, L4 of the sipes intersecting to form a well.

6. The tread according to claim 1, wherein for a plurality of wells the reduced-section part does not open onto the tread surface of the tread in the new state.

7. The tread according to claim 1, wherein the height of the reduced-section part of a well is at least equal to 1 mm.

8. The tread according to claim 1, wherein the reduced-section part of a well is flanked by two maximum-section parts, a first maximum-section part opening onto the tread surface in the new state, and the other maximum-section part opening into a channel.

9. The tread according to claim 1, wherein the reduced-section part of at least one well is off-centered from the main axis of the well by at least one maximum-section part of this well.

10. The tread according to claim 1, wherein for one and the same channel a succession of wells is formed, at least two of these wells differing geometrically in terms of the position of the reduced-section part in the depthwise direction of the well.

11. A tire comprising a tread according to claim 1.

* * * * *